INVENTOR.
Harry C. Zeisloft
BY
Robert E. McCollum
ATTORNEY

United States Patent Office 3,090,198
Patented May 21, 1963

3,090,198
SWIVEL NOZZLE CONTROL
Harry C. Zeisloft, Brookfield, Wis., assignor to General Motors Corporation, Detroit, Mich., a corporation of Delaware
Filed Nov. 17, 1960, Ser. No. 70,027
4 Claims. (Cl. 60—35.55)

This invention relates to a fluid jet nozzle. More particularly this invention relates to a guidance mechanism for a fluid jet nozzle of the swivel type.

In the guidance of rockets and the like having fixed exhaust nozzles, some type of steering control means must be provided to permit the rocket to continuously change its direction of flight so that the gases from the exhaust nozzle always vector in the proper direction to keep the rocket on the desired path. In the past, this control means has taken the form of, for example, rudders in the jet stream to partially deflect the stream and thereby change the direction, or stream deflecting means in the form of vanes arcuately swingable into the exhaust stream. Both of these methods of steering are very inefficient, however, and involve many problems in connection with their control and the ability of the materials used to withstand the tremendous heat of the exhaust gases.

This invention eliminates these objections by providing a reaction powered exhaust nozzle of the swivel type whereby the nozzle itself is deflected to its different positions by one or more auxiliary jet steering nozzles.

Therefore, it is an object of this invention to provide a guidance system for a swivel type jet nozzle whereby the nozzle is reaction powered to its several positions by auxiliary jet nozzles.

Other objects, features and advantages will become apparent upon reference to the succeeding description of the invention and to the drawings illustrating the preferred embodiment thereof, wherein.

Figure 1:
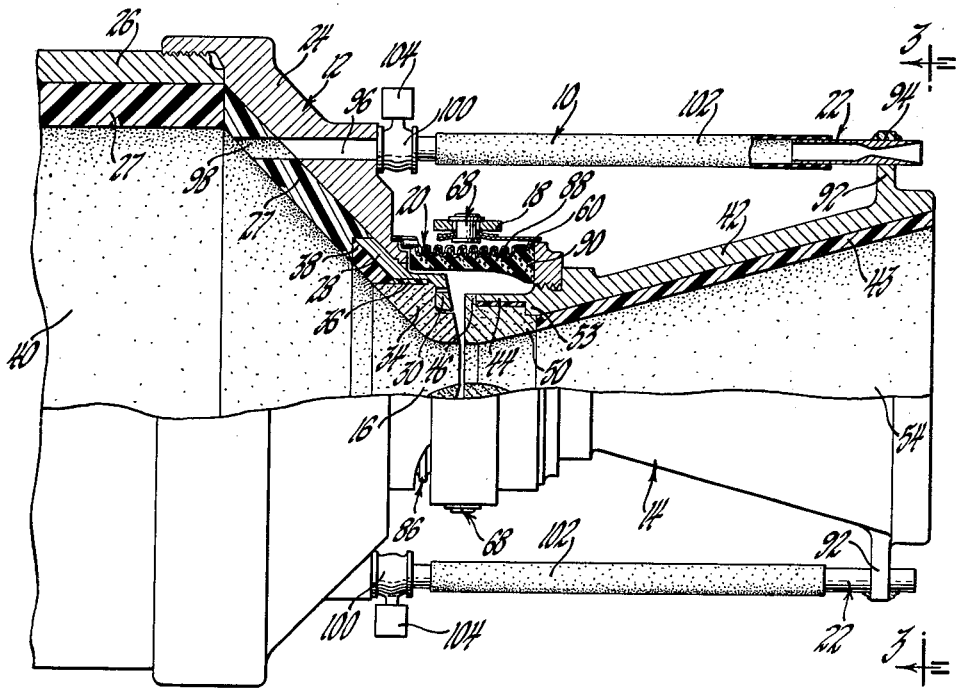
FIGURE 1 is a side elevational view with parts broken away and in section of a jet exhaust nozzle embodying the invention.

The drawings, and particularly FIG. 1, show a gas jet exhaust nozzle 10 of the converging-diverging swivel type connected, in this particular instance, to the aft end of a rocket casing to together form a rocket engine. In general, the nozzle has a stationary annular converging gas inlet portion 12 axially aligned with an annular diverging moveable gas exit portion 14, a throat section 16 of minimum cross-sectional area being formed at the point of juncture between. The moveable portion 14 is pivotally supported on the stationary portion by a gimbal ring 18 to permit a full 360° positioning of the moveable portion. A flexible nozzle seal 20 seals the joint between portions against the loss of exhaust gases from the nozzle. Nozzle portion 14 is adapted to be swiveled by four secondary or auxiliary steering nozzles 22 operable individually or in combination with each other.

More specifically, the converging stationary portion 12 has a hollow conical body 24 threadedly secured at one edge to the aft end of a rocket casing 26. Both the casing and nozzle body are lined with cooperating annular heat resistant insulation 27, such as, for example, a filled phenolic laminate, and the two linings are cemented in place as shown. Secured within the throat inlet edge of the body is a conical sleeve retainer 28 having a flanged retaining portion 30 engaged in a recess 32 in a conical throat inlet liner 34 formed of graphite or the like. Sleeve 28 retains the throat liner in place and is separated therefrom by an insulating ring 36. Additional annular insulation 38 lines the remaining portion of the sleeve and is molded to blend with the adjacent surfaces so that a smooth streamlined converging conical gas passage 40 is formed within the parts of the stationary nozzle portion 12.

The diverging nozzle portion 14 consists primarily of a conical housing 42 lined with an annular insulation 43 of Durez or the like. Casing 42 is extended at its inlet end and suitably shaped to form a throat exit cone retaining sleeve or jacket 44. The sleeve 44 at its upstream edge abuts the radially extending flange 46 of a conical throat exit liner 50 constituting, together with liner 34, the throat section of the nozzle. Liner 50 may be formed of graphite or the like. Liner 50 is shrunk into place in the jacket 44 with an insulating ring 52 of a filled phenolic laminate or other suitable material positioned inbetween. The liner abuts a shoulder 53 on the casing 42 and the insulation 43, the liner and insulation both having internal surfaces providing a smooth streamlined diverging or conical exhaust gas passage 54.

Figure 4:
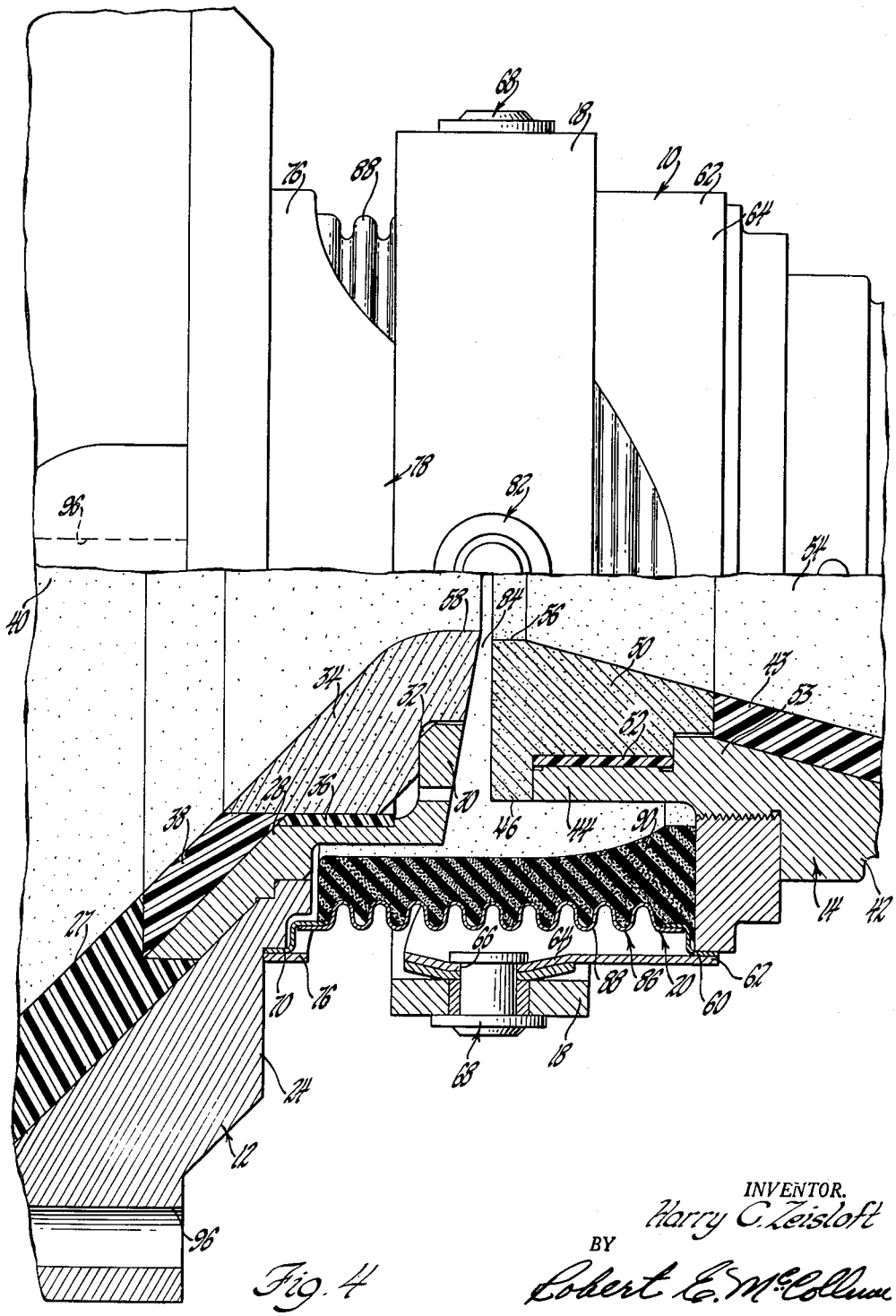
FIGURE 4 is an enlarged view of the nozzle of FIG. 1 and with other parts broken away and in section.

As seen more clearly in FIG. 4, the conical inlet edge 56 of the throat exit liner 50 is sheared off or enlarged to a diameter greater than that of the innermost adjacent edge 58 of the throat inlet liner 34 so as not to project into the gas stream at any rotative positions of the nozzle. Otherwise, the edge 56 would project into the gas stream in some positions of the nozzle, and would decrease the volume of flow through the throat by choking off the throat area.

As thus far described, therefore, a smooth streamlined gas passage is provided at all rotative positions of the nozzle, the passage having a converging inlet section 40, a throat section 16, and a diverging section 54. The break between or point of cleavage of the two nozzle portions is at the minimum throat diameter for a purpose to be described.

The nozzle portion 14 is pivotally joined to nozzle portion 12, as stated previously, by a gimbal ring 18 to permit a full 360° positioning of the moveable nozzle portion. Welded to the moveable portion 14 is a mounting ring 60 to which is spot welded the two semi-cylindrical parts of a sheet metal coupler 62 surrounding the portion. Coupler 62 has locally enlarged areas 64 in each part as shown extending beyond the centerline of the throat section and provided with suitable holes 66 for a pivotal connection to the gimbal ring 18 by a rivet and washer combination 68. The enlarged areas 64 are located diametrically opposite each other.

A mounting ring 70 is similarly welded to the stationary portion 12 and also has two semi-cylindrical parts 76 of another coupler 78 welded thereto. Parts 76 are likewise enlarged locally at diametrically opposite points and are provided with holes for a pivotal connection with the gimbal ring 18 by rivet and washer combinations 82. However, the enlarged areas of the coupler 78 secured to the stationary nozzle portion are stagegred 90° around the circumference of the ring 18 from the pivotal connections of the coupler 62 to the moveable nozzle portion. This permits pivoting of the moveable nozzle portion in two planes 90° apart to permit a full 360° positioning of the moveable nozzle portion. The mating surface configuration of the two pairs of locally enlarged areas or ears permitting this movement is best seen in FIG. 4, as well as the circumferential spacing of the connections to the gimbal ring.

The pivotal movement of the nozzle exit portion, together with the shearing off of the edge 56 of the throat exit liner 50 causes a gap or space 84 to be created between the throat inlet and exit liners effecting a flow of exhaust gas under pressure into this space. A gas seal is therefore necessary to seal the nozzle against the loss of exhaust gases into this space between portions. Such a seal is shown at 86 and comprises an annular flexible bellows 88 formed from a thin heat resistant metal alloy, such as stainless steel, for example. The opposite edges of the bellows are sealingly welded to the moveable and stationary nozzle portion mounting rings 60 and 70, respectively. A thick annular flexible coating of insulation 90, such as silicone urethane rubber or the like, is foamed in place in the grooves between the bellows ridges to insulate the bellows from the intense heat (6000–7000° F.) of the exhaust gases leaking through the space 84. The insulation, being flexible, can therefore expand to the shape shown in FIG. 5 without rupture upon pivotal movement of the nozzle.

By suitable calculations and tests, it has been found that the lowest pressure of the gases in the passage between the nozzle inlet and the throat occurs at the throat in a nozzle of this type, and is approximately 55 percent of the nozzle inlet pressure at the point of connection to the rocket chamber. The pressure in the nozzle may, for example, vary between 500–1000 p.s.i. Therefore, since, by the construction already described, the break between the throat inlet and exit liners occurs at the minimum throat diameter, the pressure of the gases leaking through the space 84 at this point and applied to the bellows seal is considerably lower than the main rocket chamber gas pressure, which therefore permits greater flexibility of the bellows and pivoting of the nozzle without loss of exhaust gases.

Figure 5:
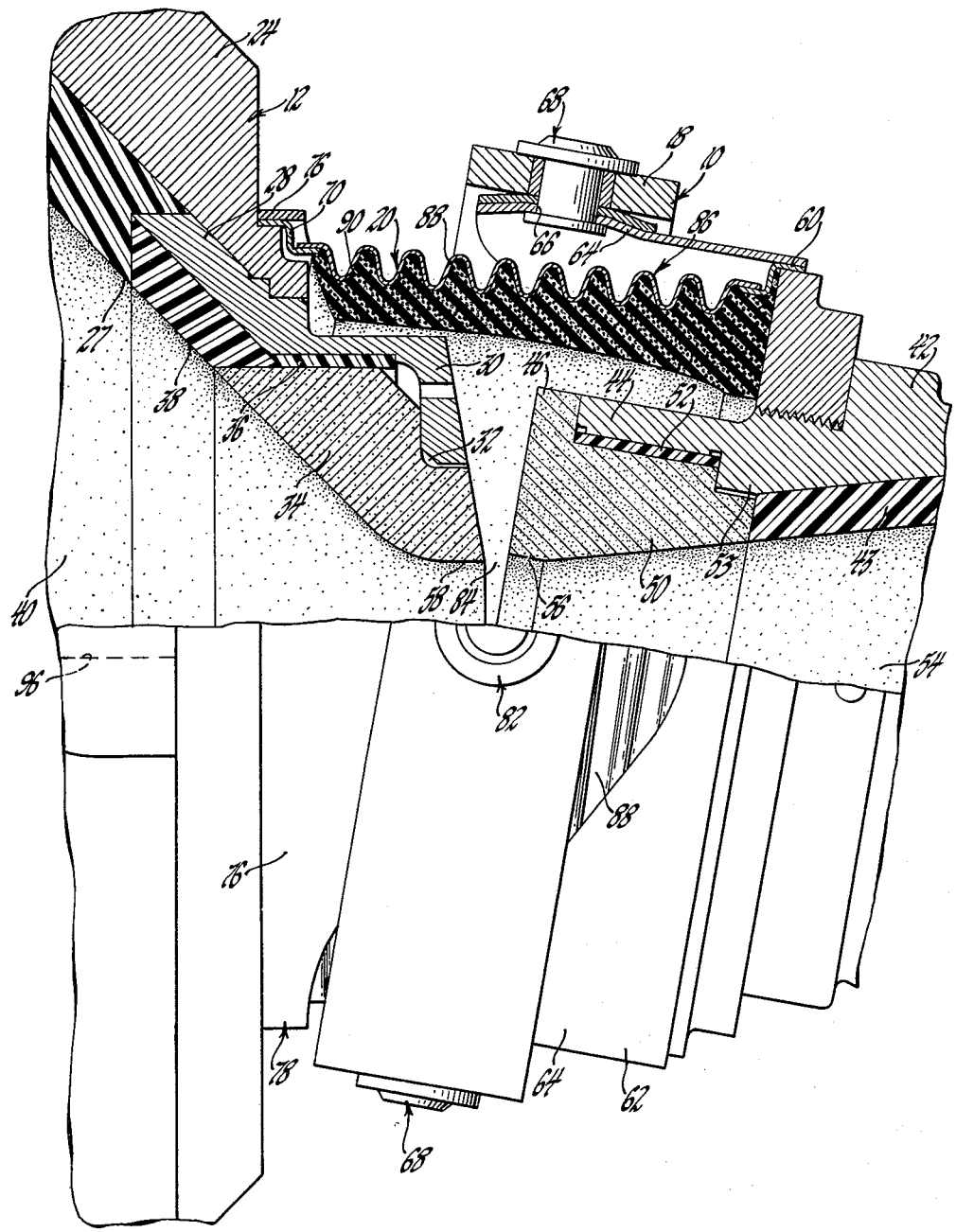
FIGURE 5 is an enlarged view of FIG. 1 illustrating the nozzle in one of its pivotal positions.

It is to be noted that the bellows in this instance is installed under compression so that in its maximum extended position indicated in FIG. 5, the bellows will be in its free state with no tensile load.

Figure 2:
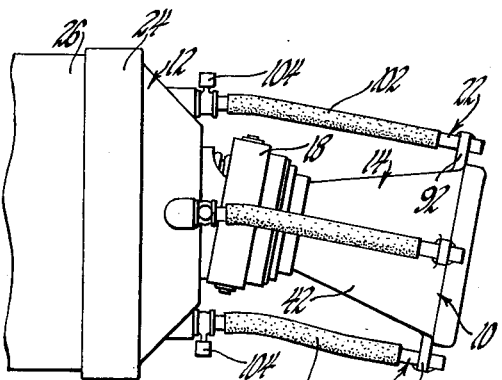
FIGURE 2 is a side elevational view on a reduced scale of the nozzle of FIG. 1 in a different rotative position.
Figure 3:
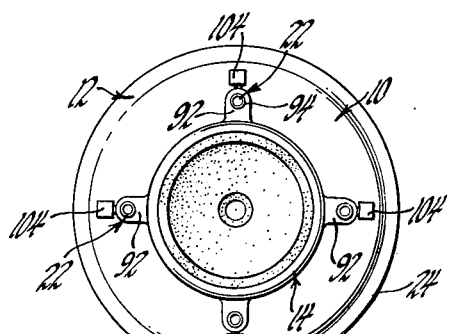
FIGURE 3 is an end view on a reduced scale of the nozzle of FIG. 1 taken on a plane indicated by and viewed in the direction of the arrows 3—3 of FIG. 1.

The means for tilting the moveable nozzle portion to its several positions, as stated previously, consists of four secondary or auxiliary gas jet nozzles 22. As best seen in FIGS. 1–3, the moveable nozzle portion 14 has at its outlet end four steering nozzle supporting ears 92 secured to and projecting from the casing 42. The ears are each provided with a hole 94 through which a steering nozzle 22 is inserted and secured to the ear so that the steering nozzle and main nozzle move as a unit. Each of the steering nozzles is fed exhaust gases from the rocket chamber through bores 96 and 98 in the nozzle body and insulation, a gate or similar type valve 100, and a flexible fiberglass or silicone rubber conduit 102 connected at one end to the nozzle. The flow of exhaust gases into and through the venturi of the steering nozzles provides a thrust force which, acting about the moment arm from the axis of rotation of the main nozzle to the steering nozzle, causes a torque or turning force to be applied to the moveable nozzle portion to tilt or deflect the main nozzle in the desired direction, as seen in FIG. 2. This, therefore, positions the main nozzle as required to provide proper guidance applying the main thrust force in the direction required by the missile or rocket guidance system, for example.

The admission of gases to each of the steering nozzles is controlled selectively by the gate valve 100 secured as shown in each of the lines between the bore 96 and end of the flexible tube 102. Valve 102 moves variably between open and closed positions to control the quantity of exhaust gases passing to the steering nozzle, and is automatically controlled by control means indicated schematically at 104. The details of the control means 104 are not given since they are unnecessary to an understanding of the invention, and are known. Suffice it to say that each of the control means 104 receives a separate signal from an autopilot or similar mechanism in the rocket guidance control system to open or close the valves singularly or collectively to feed the rocket chamber exhaust gases selectively to the steering nozzles. The control means may be mechanical or electrical, as a matter of choice and design conditions, and feed-back and other corrections for over-steering are automatically taken care of by the guidance system provided. The guidance system therefore automatically controls each of the four gate valves to selectively feed the exhaust gases in varying quantities through one or more of the different steering nozzles to provide the proper tilt to the main nozzle to maintain the rocket on its predetermined course.

The operation of the nozzle as a whole is believed to be clear from an inspection of the drawings and the description already given.

From the foregoing, therefore, it will be seen that this invention provides a steering mechanism for a swivel type jet nozzle consisting of a number of auxiliary nozzles selectively effecting the application of a turning force on the main nozzle to tilt it to the desired position to apply the main thrust force in the desired direction.

While the invention has been illustrated in its preferred embodiment as illustrated in the figures, it will be obvious to those skilled in the arts to which this invention pertains that many modifications may be made thereto without departing from the scope of the invention.

I claim:

1. A reaction powered main swivel type fluid jet nozzle having relatively pivotally mounted moveable and stationary hollow portions together defining a fluid passage therewithin communicating at one end with a main fluid chamber, and an auxiliary fluid reaction jet nozzle secured to the outside of said moveable nozzle portion and extending in substantially the same direction as the moveable nozzle portion for applying a turning force on said moveable portion upon the passage of fluid through the auxiliary nozzle, flexible conduit means connecting said auxiliary nozzle and the fluid in said main fluid chamber, and means in said conduit means to control the flow of fluid through said auxiliary nozzle to control the jet reaction force therefrom operable on said main moveable nozzle portion to deflect the moveable portion.

2. A steering mechanism for a main swivel type fluid jet nozzle having relatively pivotally mounted moveable and stationary hollow portions together defining a fluid passage therewithin and communicating at one end with a main fluid chamber, said steering mechanism including a secondary fluid reaction jet nozzle secured to the outside of said moveable nozzle portion and extending in substantially the same direction as the moveable nozzle portion, flexible tube means connecting said secondary nozzle and the fluid in said main fluid chamber, and control means in said conduit means operable between open and closed positions to vary the admission of fluid from said main chamber to said secondary nozzle, the passage of fluid through said secondary nozzle providing a jet turning force operable on said main moveable nozzle portion to swivel the moveable portion, the tube means bending to accommodate movement of said moveable nozzle portion without interruption of flow of fluid through said secondary nozzle.

3. A guidance mechanism for use in connection with a main swivel type fluid jet nozzle having axially aligned moveable and stationary hollow portions pivoted to each other for a relative swivel movement therebetween and together defining a fluid passage therewithin, said stationary portion communicating with a main fluid chamber, said guidance mechanism including a secondary fluid jet nozzle secured to said moveable nozzle portion at a position radially outwardly therefrom and extending parallel to the direction of extension of said moveable portion, conduit means connecting said secondary nozzle and said main fluid chamber to conduct the fluid therein to said secondary nozzle, and control means in said conduit means operable between open and closed positions to vary the admission of fluid from said main chamber to said secondary nozzle, the passage of fluid through said secondary nozzle providing a jet turning force operable on said main moveable nozzle portion to deflect the moveable portion.

4. A steering mechanism for use in connection with a main swivel type fluid jet nozzle having axially aligned moveable and stationary hollow portions pivoted to each other for a relative swivel movement therebetween and together defining a fluid passage therewithin, said stationary portion communicating with a main fluid chamber, said steering mechanism including a plurality of secondary fluid jet nozzles each secured to said moveable nozzle portion at the periphery thereof and being circumferentially spaced from each other, flexible conduit means connecting each of said secondary nozzles and said main fluid chamber to conduct the fluid therein to each of said secondary nozzles, and selectively operable control means in each of said conduit means operable between open and closed positions to vary the admission of fluid from said main chamber to each of said secondary nozzles, the selective passage of fluid through said secondary nozzles effecting thrust forces therefrom causing torques to be applied to said main moveable nozzle portion to swivel the moveable portion.

References Cited in the file of this patent
UNITED STATES PATENTS

| | | |
|---|---|---|
| 2,822,755 | Edwards et al. | Feb. 11, 1958 |
| 2,919,546 | David | Jan. 5, 1960 |